(12) United States Patent
Kwakkernaat et al.

(10) Patent No.: US 10,088,551 B2
(45) Date of Patent: Oct. 2, 2018

(54) ASSURED VEHICLE ABSOLUTE LOCALISATION

(71) Applicant: Nederlandse Organisatie voor toegepast-natuurwetenschappelijk onderzoek TNO, The Hague (NL)

(72) Inventors: Maurice Rogier Jozef Arthur Emanuel Kwakkernaat, The Hague (NL); Tjerk Bijlsma, The Hague (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 348 days.

(21) Appl. No.: 14/784,561

(22) PCT Filed: Apr. 14, 2014

(86) PCT No.: PCT/NL2014/050232
§ 371 (c)(1),
(2) Date: Oct. 14, 2015

(87) PCT Pub. No.: WO2014/171821
PCT Pub. Date: Oct. 23, 2014

(65) Prior Publication Data
US 2016/0069985 A1      Mar. 10, 2016

(30) Foreign Application Priority Data

Apr. 15, 2013   (EP) .................................... 13163767

(51) Int. Cl.
*G01S 5/14*      (2006.01)
*G01S 13/93*     (2006.01)
(Continued)

(52) U.S. Cl.
CPC ............... *G01S 5/14* (2013.01); *G01S 1/06* (2013.01); *G01S 5/0284* (2013.01); *G01S 13/42* (2013.01);
(Continued)

(58) Field of Classification Search
CPC ...... G01S 1/02; G01S 1/04; G01S 1/06; G01S 5/14; G01S 5/0284; G01S 13/931; G08G 1/0116; G08G 1/0112
See application file for complete search history.

(56) References Cited

U.S. PATENT DOCUMENTS 4,031,513 A  *  6/1977  Simciak ................. G01D 4/006
                                                   340/13.25
5,289,183 A  *  2/1994  Hassett ................. G01S 13/765
                                                   340/905
(Continued)

FOREIGN PATENT DOCUMENTS

EP          0 601 037 B1      6/1994
JP          H10-142328 A      5/1998
(Continued)

OTHER PUBLICATIONS

International Search Report and Written Opinion dated Oct. 7, 2014, from International Application No. PCT/NL2014/050232 (15 pages).

*Primary Examiner* — Peter M Bythrow
(74) *Attorney, Agent, or Firm* — Kilpatrick Townsend & Stockton LLP (57) ABSTRACT

It is proposed to provide a system for localizing a vehicle in a marked environment, provided with a set of markers, e.g. on a road side, the markers emitting a position signal indicative of a respective marker's known geographical position. The system comprises a distance detection unit and a processing unit provided in the vehicle, the processing unit adapted to receive said position signal of a respective marker. The processing unit is adapted to receive said known
(Continued)

geographical position from the position signal of said respective marker; and to estimate a first distance measure of the vehicle relative to the respective marker based on a position signal measurement. The processing unit feeds said estimated first distance measure to the distance detection unit; the distance detection unit being adapted to detect said marker within the first distance measure by a second distance measure. The distance detection unit is further adapted to provide the processing unit with the second distance measure of the vehicle relative to the detected marker and with a detection angle of the detected marker; and the localization unit calculating an instantaneous geographical position of said vehicle from the second distance measure; the detection angle and the marker's known geographical position.

14 Claims, 6 Drawing Sheets

(51) Int. Cl.
    *G01S 1/06*         (2006.01)
    *G01S 5/02*         (2010.01)
    *G01S 13/42*       (2006.01)
    *G08G 1/01*        (2006.01)
    *G08G 1/04*        (2006.01)
    *G08G 1/095*      (2006.01)
(52) U.S. Cl.
    CPC .......... *G01S 13/931* (2013.01); *G08G 1/0112* (2013.01); *G08G 1/0116* (2013.01); *G08G 1/04* (2013.01); *G08G 1/095* (2013.01)

(56) References Cited

U.S. PATENT DOCUMENTS

| | | | | |
|---|---|---|---|---|
| 5,510,794 A * | 4/1996 | Asbury | ............... | G01S 13/24 342/42 |
| 5,781,119 A * | 7/1998 | Yamashita | ............ | G05D 1/024 180/168 |
| 7,034,741 B2 * | 4/2006 | Chon | ............... | G08G 1/042 342/42 |
| 7,545,261 B1 * | 6/2009 | Harrington | ............ | G08G 1/163 340/435 |
| 7,746,271 B2 * | 6/2010 | Furstenberg | ............ | G01S 1/026 342/357.23 |
| 8,301,374 B2 * | 10/2012 | Surampudi | ............ | G01C 21/12 701/23 |
| 8,907,813 B2 * | 12/2014 | Cajigas Bringas | .... | G08G 1/052 340/539.1 |
| 2002/0140924 A1 * | 10/2002 | Wangler | ............... | G01S 7/4802 356/28 |
| 2003/0189500 A1 * | 10/2003 | Lim | ................ | G08G 1/0175 340/937 |
| 2005/0065724 A1 * | 3/2005 | Lee | ................ | G01S 13/825 701/408 |
| 2008/0052000 A1 * | 2/2008 | Furstenberg | ............ | G01S 1/026 342/357.23 |
| 2008/0167819 A1 * | 7/2008 | Breed | ................ | G08G 1/161 701/300 |
| 2008/0238771 A1 * | 10/2008 | Katayama | ............... | G01C 21/28 342/357.31 |
| 2008/0278365 A1 * | 11/2008 | Klein | ................ | G01S 13/584 342/104 |
| 2011/0037647 A1 * | 2/2011 | Tajima | ............... | G01S 5/0072 342/357.26 |
| 2011/0054791 A1 * | 3/2011 | Surampudi | .......... | G01C 21/005 701/472 |
| 2011/0238306 A1 * | 9/2011 | Miucic | ............... | G01C 21/28 701/469 |
| 2011/0301844 A1 * | 12/2011 | Aono | ................ | G01S 13/931 701/300 |
| 2012/0271540 A1 * | 10/2012 | Miksa | ............... | G01C 21/30 701/409 |
| 2012/0283947 A1 | 11/2012 | T'Siobbel | | |
| 2012/0290146 A1 | 11/2012 | Dedes et al. | | |
| 2012/0326914 A1 * | 12/2012 | Nagy | ............... | G01S 7/415 342/27 |
| 2013/0293422 A1 * | 11/2013 | Guner | ............... | G08G 1/017 342/386 |
| 2014/0159948 A1 * | 6/2014 | Ishimori | .............. | G01S 7/41 342/200 |
| 2015/0054676 A1 * | 2/2015 | Vinski | ............... | G01S 13/74 342/51 |
| 2015/0198711 A1 * | 7/2015 | Zeng | ............... | G01S 13/726 342/59 |

FOREIGN PATENT DOCUMENTS

| | | |
|---|---|---|
| JP | 2006-275904 A | 10/2006 |
| WO | 2012/154117 A1 | 11/2012 |

* cited by examiner

ASSURED VEHICLE ABSOLUTE LOCALISATION

FIELD OF INVENTION

The invention relates to a method and device for localizing a vehicle in a field provided with localization markings.

BACKGROUND

Nowadays, instantaneous measurements of moving objects, vehicles in particulars, have become common place technology. Widely known and used in the current technology for geographical position measurement is the GPS satellite measurement technique. These techniques have become the work horse for all kinds of applications, where a precise measurement of a vehicle position is necessary. E.g. for calculating a position on a map, calculating driving directions, calculating distances travelled etc.

However, GPS techniques suffer from various drawbacks that makes them vulnerable for malfunction and misuses. Absence of secure positioning will be a game stopper for cooperative applications that depend upon the users' (absolute) location and traces. Such applications may be financial applications, that tax travelling, in particular, in time and geographical zones.

To save money consumers might spoof/mislead the GPS sensor. On the other hand, safety applications cannot rely on an insecure GPS sensor, where the reliability of reception is always a challenge, especially for difficult terrains, such as urban areas and tunnels.

It is an objective to provide an alternative on GPS based locations, that uses fixed landmarks of known geographical positions. WO 20120154117 provides such a system, that tracks road side based delineator posts by radar reflection. However, this system relies on visibility of a tag that provides the position information, which may be difficult in practical circumstances e.g. when pollution or wear reduces the visibility. Also, the system has to know in advance that a certain radar reflective object needs to be scanned for visible inspection, which may be confusing with many reflective objections in the area.

JP2006275904 teaches a system of passive lane markers buried in the road that are registered in an annexed road side unit. The lane markers are only detected when passed by a vehicle.

US2011/0238306 is another prior art that relies on line of sight detection with other remote vehicles or objects, for example road side units. However, determination of a line of sight signal is done by comparing multipath signals or using a rule scheme for selecting preferred sources. In practice this calls for solutions where further reliability of the detection of a vehicle's location is desired.

SUMMARY OF THE INVENTION

To overcome these drawbacks it is proposed to provide a system for localizing a vehicle in a marked environment, i.e. provided with a set of markers, e.g. on a road side, the markers emitting a position signal indicative of a respective marker's known geographical position. The system comprises a processing unit and a distance detection unit provided in the vehicle, the processing unit adapted to receive said position signal of a respective marker. The processing unit is adapted to receive said known geographical position from the position signal of said respective marker; and to estimate a first distance measure of the vehicle relative to the respective marker based on a position signal measurement. The processing unit feeds said estimated first distance measure to the distance detection unit; the distance detection unit being adapted to detect said marker within the first distance measure by a second distance measure. The distance detection unit is further adapted to provide the processing unit with the second distance measure of the vehicle relative to the detected marker; and the localization unit calculating an instantaneous geographical position of said vehicle from the second distance measure and the marker's known geographical position. The first distance measure has a lower accuracy than the second distance measure.

Accordingly, a secure and accurate absolute position can be received in a vehicle, that is suited for difficult terrain, such as urban areas and tunnels.

DETAILED DESCRIPTION

Figure 1:
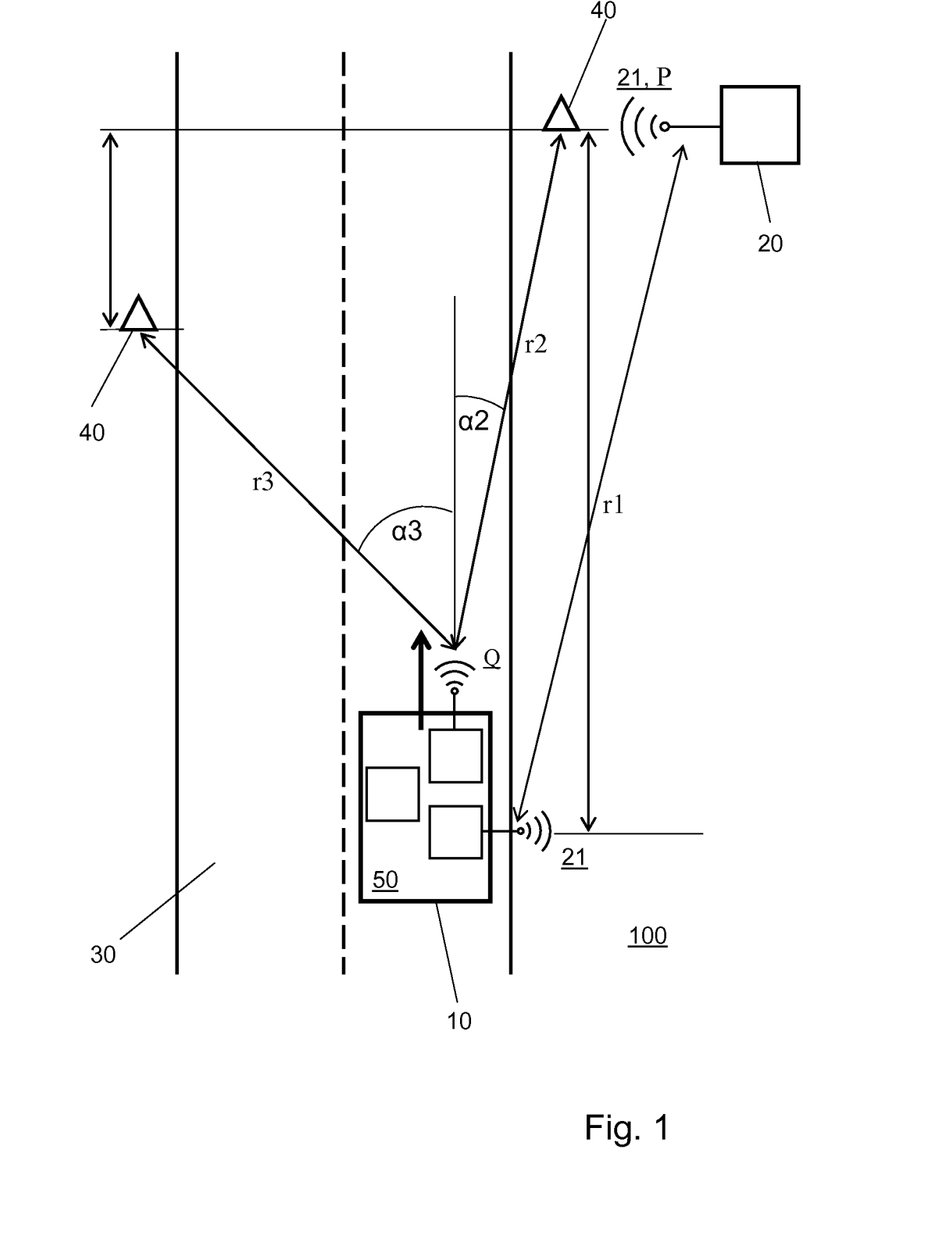
FIG. 1 shows a schematic arrangement of the system as set forth here below.

In the example of FIG. 1, schematically, a system 100 is provided for localizing a vehicle 10 in a marked environment, i.e. provided with a set of markers 20, e.g. on a side of a road 30, the markers 20 emitting a position signal 21 indicative of a respective marker's known geographical position P.

While the position signal may be any suitable signal in the electromagnetic spectrum, preferably it is transmitted using the IEEE802.11p radio communication protocol, i.e. a radio signal in combination with the ITS-G5 protocol. This is a harmonized standard for 5.9 GHz (ETSI EN 302 571), commonly known to the skilled person. Other suitable signals may be provided by communication media, including cellular, 5 GHz, 63 GHz, optical spectrum, infra-red links.

In the vehicle 10 a localization unit 50 is provided. The unit will be described in more detail with reference to FIG. 2 (below). It comprises a processing unit, a communication unit and a distance detection unit. The communication unit is able to receive a marker position signal 21 of a corresponding marker 20, preferably, at a reception distance larger than 200 m.

If the signal emitting marker 20 and the passive marker 40 are physically combined in a single structure, this may have an advantage that the markers can be located with more sustained reliability. Such a structure may also be called a road side marker unit (RSMU). The processing unit in unit 50 is suited for calculating an instantaneous geographical position of the vehicle 10. A first, relatively course distance (r1), between the emitting marker 20 and the localization unit 50, can be detected by the communication unit 56. The distance detection unit may be suited for more accurate distance measurements (r2, r3) of a second, relatively fine distance measure and/or angle measurements ($\alpha 2$, $\alpha 3$) of the vehicle 10 to respective markers 40, which in the example is a passive marker structure distinct from the signal emitting marker 20. The advantage is that a number of passive markers 40 can be provided for each signal emitting marker 20.

Figure 2:
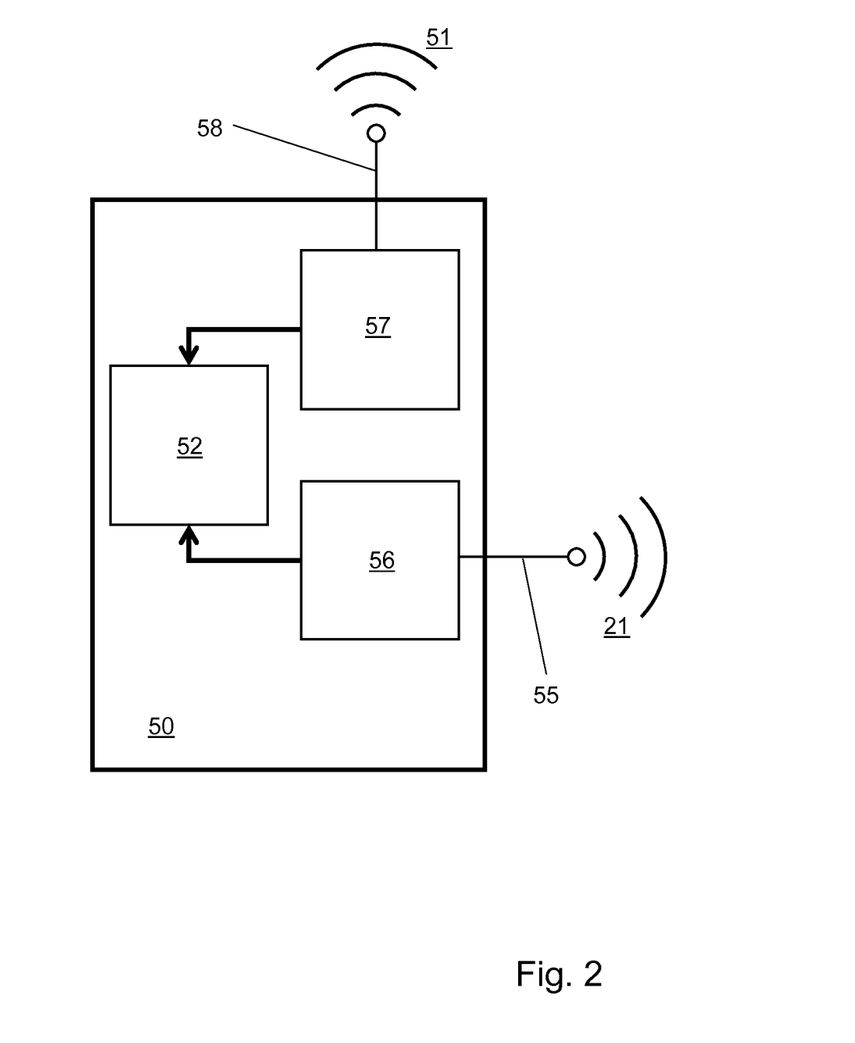
FIG. 2 shows a schematic arrangement of the localization unit in the vehicle.

In more detail, FIG. 2 shows building blocks 52, 56 and 57 of the localizing unit 50, that is provided in the vehicle 10. The communication unit is typically a radio receiver 56 (see FIG. 2) having an antenna 55, or optionally an optical receiver having an optical sensor or any suitable means for receiving the position signal. In the example, the radio receiver 56 has an antenna 55 suited for reception of e.g. the ITS-G5 signal. The receiver 56 is under control of the processing unit 52, and is able to tune in on the signal 21 that corresponds with a subsequently detected marker 20. This may be realized by the receiver 56 having detection functionality to measure a received signal strength, in order to lock in to a carrier frequency or any suitable method to connect to the transmission signal.

The localizing unit 50 further comprises a distance detection unit 57 typically in the form of a radar detector and corresponding emitter 58 having a position accuracy between 0.1 and 10 meter that can be achieved at ranges between 10 and 100 meter; and a distance measurement unit (not shown) coupled to the radar detector 58. The radar detector unit 57 may be a conventional radar sensing unit as commercially available and currently employed in automotive applications, wherein the distance measurement unit is formed by circuitry that may be included in the distance detection unit 57, or may be provided in the processing unit 52. The distance detection unit 57 may be in two way communication with the processing unit 52. Furthermore processing unit 52 is adapted to receive, via said communication unit 56, said position signal 21 of a respective marker 20. The position signal 21 comprises digitally encoded position information of the marker 20, for instance an indication of the marker's geographical coordinates P.

The signal received from the communication unit 56 is processed by the processing unit 52 thus adapted to receive said known geographical position from the position signal 21 of said respective marker 20.

The received signal strength indication (RSSI) or time of flight (ToF) can also be used to measure the first distance (r1) of the vehicle, in particular, the localizing unit 50, relative to a marker 20 emitting the position signal 21. This is shown in the steps A and B illustrated in FIG. 3.

Figure 3A:
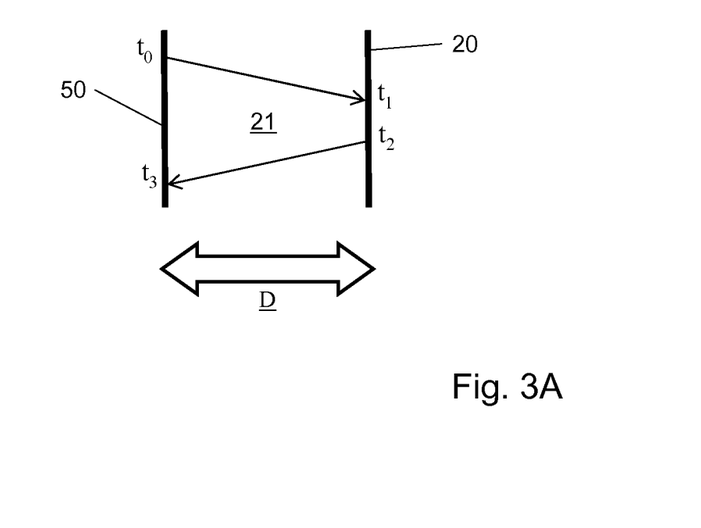
FIG. 3 shows a schematic illustration of a first distance measurement.

In the step of FIG. 3A, once the vehicle's localizing unit 50 is locked in on the signal 21 so that two-way communication may be enabled, wherein, for instance, a ToF measurement can be performed to measure a first distance D of the vehicle, in particular, the localizing unit 50, relative to a marker 20 emitting the position signal 21.

The ToF may be measured by exchanging a timestamp between the moving vehicle 50 and road side marker unit 20. In this FIG. 3A, the vehicle sends a message to a road side marker unit, the road side marker unit reacts by sending its delta (i.e. t2−t1) which the vehicle can subtract from its own delta (t3−t0), to obtain the communication time, which can be used to compute the distance between the vehicle and road side marker unit. A first distance between the vehicle 50 and the marker unit 20 may be expressed as $$((T3-T0)-(T2-T1))*speed\_of\_light*\frac{1}{2}$$

This first distance measurement is sensitive to inaccuracies, because a 3 ns delay corresponds to 1 m and results to a course distance measure.

Alternatively, a received signal strength indication (RSSI) measures the range by determining the strength of the received signal 21, or the radio energy. This value is part of the IEEE 802.11 standard. Preferably, when no relation between the signal strength and the returned value is defined this value may be calibrated. This approach may be somewhat sensitive to multipath of the signal, i.e. signal reflections which occur more close to the signal source and in urban areas. Nevertheless, RSSI may be a good indication when the signal source is approached.

The RSSI and ToF can be used to determine at the first distance D (up to 550 m) the range until the radar reflector can be expected. An accuracy in the order of 5-30 m is expected.

This range estimate D is used to filter radar object detections and to find the RSU radar reflector 40.

Figure 3B:
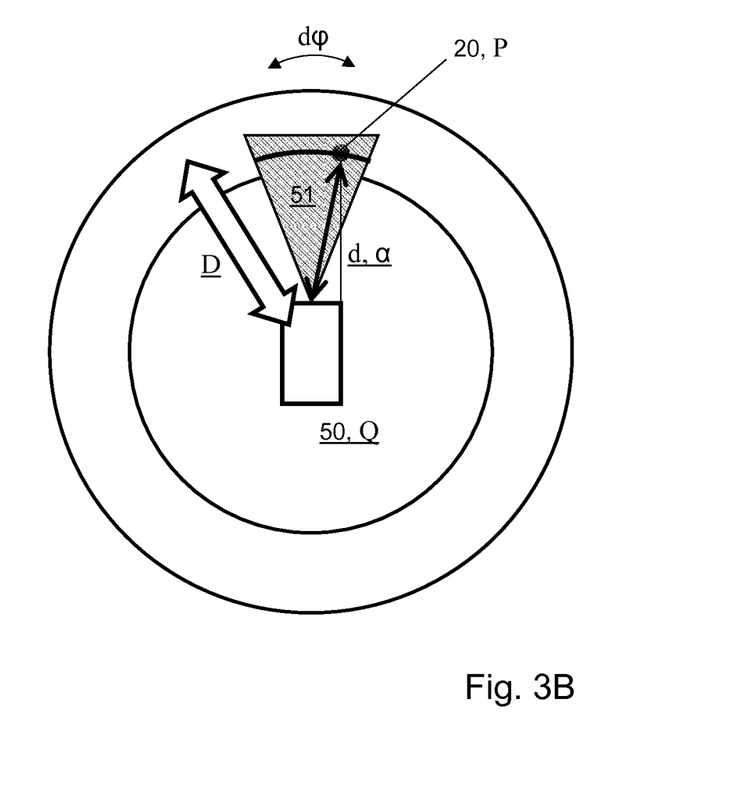

From the first distance measure D of the vehicle 50 relative to the respective marker 40 based on measurement of the position signal 21, a second distance measurement d can be performed in the step of FIG. 3B. To this end, the processing unit 52 feeds said estimated first distance measure D to the distance detection unit 57, wherein the distance detection unit 57 is adapted to detect said marker 40 within the first distance measure D by a second distance measure d (see FIG. 3b).

The distance detection unit may operate with a field of view, which defines an angle range $d\varphi$, as indicated in FIG. 3B. As may be illustrated in subsequent examples, alternative angle measurements or estimations may be used to identify the second distance relative position (d, $\alpha$) within a field of view $d\varphi$ relative to the road side marker unit 20. Alternative to an angle measurement additional distance measurements may be carried out to triangulate an exact position of the vehicle 50. Alternatively a camera may be used for estimating a lateral position of the vehicle relative to the road side. By using lateral distance y and the second, fine detection measure d, angle $\alpha$ can be calculated.

To determine the second distance relative position, the distance detection unit 57 is adapted to provide the processing unit with the second distance measure d of the vehicle relative to the detected marker 51 and with a detection angle $\alpha$, eg, relative along a longitudinal axis in the forward direction of the vehicle of the detected marker. From the radio signal 21, an absolute marker's known geographical position P can be determined by decoding the digitally position information; and the processing unit 52 calculates an instantaneous geographical position Q of said vehicle 50 from the second distance measure d the marker's known geographical position Q and, in the current example, detection angle $\alpha$ in the field of view, with an accuracy that is better than the accuracy of the first distance measure. For example the second distance measure d can have a meter or even sub-meter accuracy, wherein the first distance measure may have an accuracy larger than 10 meter.

FIG. 4 illustrates a realistic arrangement of several road side marker units 20, 20' arranged on the side of a road 30, and a moving vehicle 50, that is in communication with these road side markers 20, 20'. In a method for localizing the vehicle 50 in this marked environment, i.e. a road side provided with a set of markers 20, 40, the markers 20 emit a position signal 21 indicative of a respective marker's known geographical position.

Figure 4A:
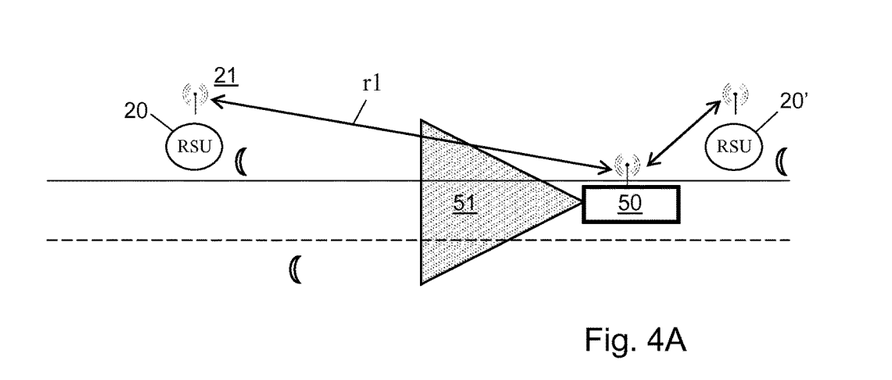
FIG. 4 shows a series of actions as carried out according to the disclosure.
Figure 4B:
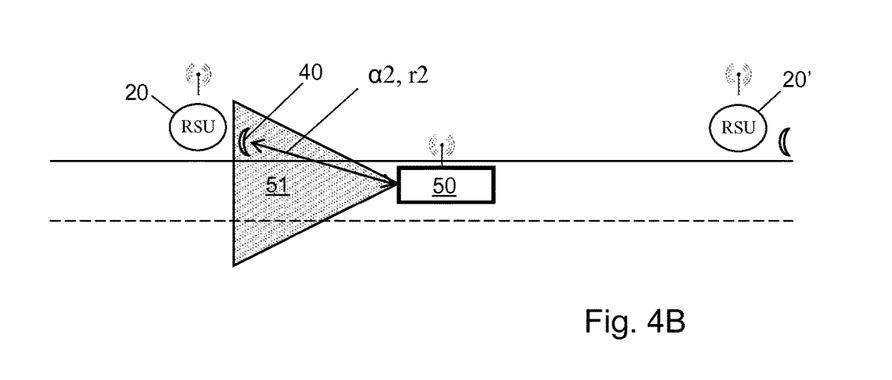
Figure 4C:
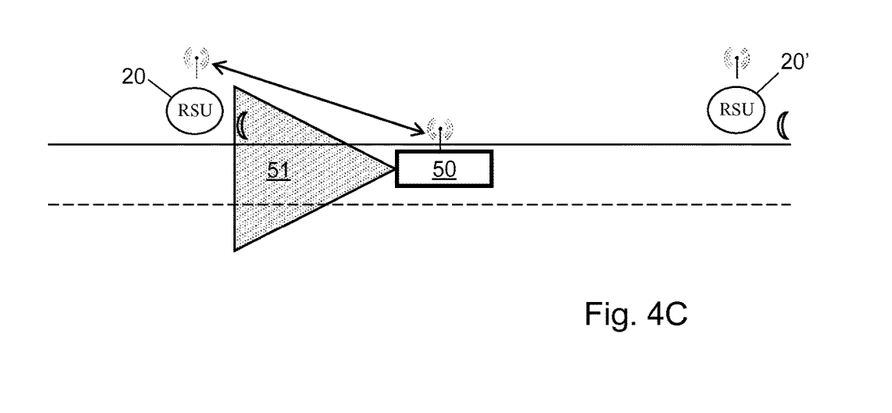

The vehicle's localization unit 50 performs the method of (A) estimating a first distance measure of the vehicle relative to the respective marker 20 based on a position signal measurement. Upon deriving said first distance from the position signal measurement, in (B), said first distance is fed to a distance detection adapted to detect, via radar detection 51, said marker 40 within the first distance measure by a second distance measure. In (C), the localizing unit 50 is provided with the second distance measure of the vehicle relative to the detected marker 20 a known geographical position of said respective marker 20 is received from the position signal 21. An instantaneous geographical position of said vehicle 50 is then calculated from the second distance measure the marker's known geographical position.

Figure 5:
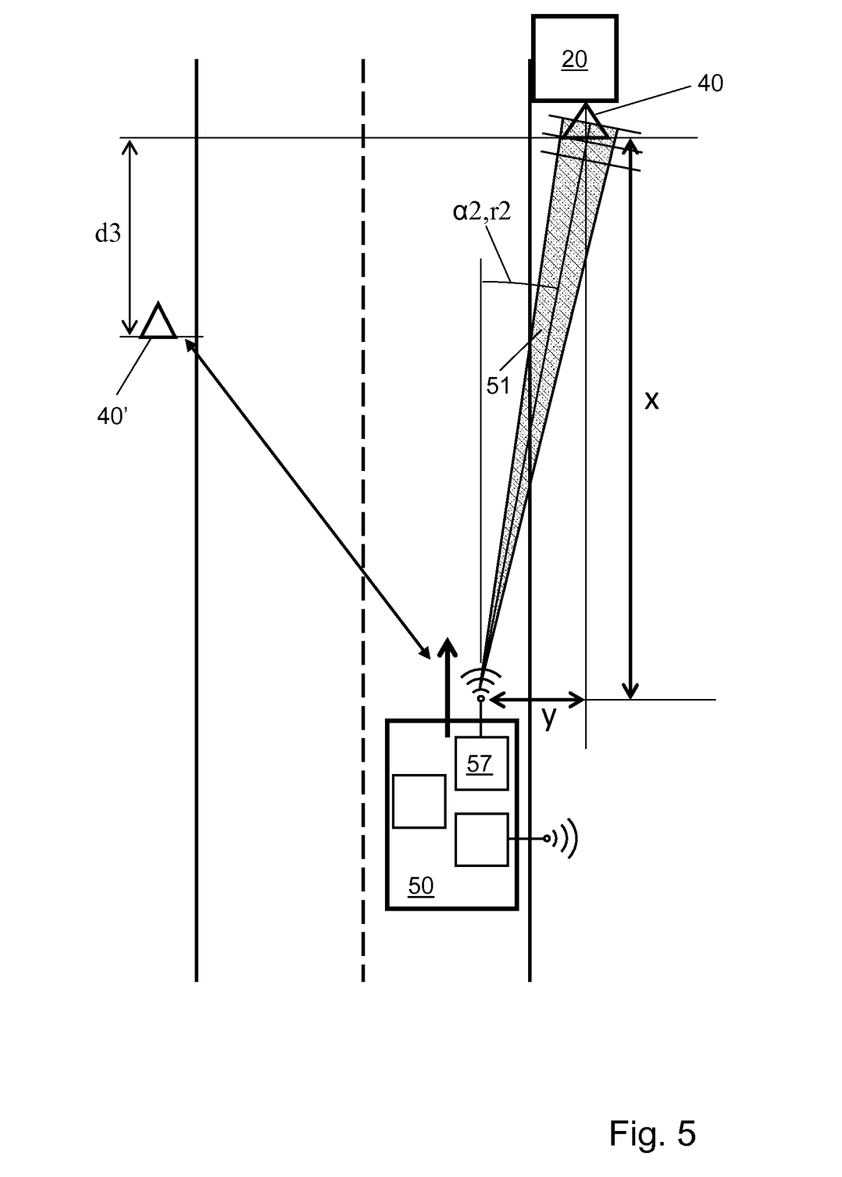
FIG. 5 shows an angle estimation, based on radar detection.

FIG. 5 shows in more detail radar detection and angle estimation by the localizing unit 50. Radar detection is carried out by radar 57 to detect a passive radar reflector 40; which is in a known geographical position, for example with fixed position relative to the marker 20. The radar reflector can be of a conventional type, e.g. a passive metal radar reflector enabling reliable detection of the marker unit 20. For example, a triangular trihedral reflector, with faces of 30 cm length has a half-power-beamwidth of 40 degrees and a maximum RCS response of 34 dBsm, which is comparable to the response of a large truck. In addition, the reflector can also be a specific form of active marking, e.g. containing time or frequency encoded information.

In the example, the localizing unit 50, in particular, the distance measurement unit 57 may have an angle detection block, which can be formed by circuitry that may be included in the distance detection unit 57. The angle detection block has an angular aperture that detects a reflected radar signal 51 in the forward direction of the vehicle' localization unit 50 within a certain margin of error.

A constellation of one active marker unit 20 and a number of passive reflectors 40 can be used to improve the absolute position accuracy of a vehicle. By relating the vehicle to multiple reflectors results in more corner distance pairs a relative position to the RSU 20 can be improved.

For example, an additional displaced reflector 40' can be used at a second known position relative to the marker unit 20 to remove ambiguities based on detected a range and angle. Using a number of passive radar reflectors, makes the system robust for obstruction by other traffic, e.g. a truck blocking radar detection of a radar reflector. The reflectors are preferably placed at sufficient interdistances, e.g. in a range of 30-70 meters to address a condition that a reflector is not detected.

E.g. the active marker may transmit information of a number of passive reflectors that are within a first distance range of the vehicle, with corresponding position information, so that the distance detection unit 57 can select radar reflections matching this first distance position information.

In a first approach relative positions of the radar reflectors 40 in relation to the road may be communicated to the vehicle 50 by marker unit 20. The radar reflectors 40, 40' are distanced from each other over d3, such that the in-vehicle radar can clearly distinguish which reflector is observed closest. If marker 40' is observed closer to the vehicle than marker 40, a vehicle driving direction can be derived. This approach is suitable for intersections and corners.

In an alternative approach, in case a reflector is missed a radar 57 observes marker 40 and derives e.g. a detection angle and detection distance ($\alpha 2, r2$), assuming the direction of the road is followed. From ($\alpha 2, r2$) the lane to marker distance (y) can be determined. It can also be determined if the marker 40 of RSU 20 is observed left or right, where e.g. right means we are driving north and left that we are driving south. Given the width of the vehicle and the lane width, an error margin for (y) can be determined.

In a further alternative approach wireless communication can be used on the detected marker 40, 40'. If communication and position information from a marker 20 is received and it is given that marker (40') is located south of (40), the vehicle can use this information to determine it is driving north.

The range and angle between the RSU radar reflector 40 and the vehicle's localizing unit 50 can be determined based on the output of a radar sensor 57 on the vehicle. Typical automotive radar sensors may have an expected accuracy in range and angle 1 m and 1 degrees, respectively. An absolute position estimation relative to a marker unit 20, for example, when the reflector 40 is positioned with a lateral distance of 5 m from the localizing unit 50, may at different ranges estimated to be:

| Distance      | Error (dx, dy) |
|---------------|----------------|
| @ x = 10 m:   | (1.0; 0.6) m   |
| @ x = 25 m:   | (1.1; 0.6) m   |
| @ x = 50 m:   | (1.1; 1.0) m   |
| @ x = 75 m:   | (1.1; 1.4) m   |
| @ x = 100 m:  | (1.1; 1.8) m   |
| @ x = 150 m:  | (1.1; 2.7) m   |

With a standard automotive radar a position error close to 1 m can be achieved at ranges below 50 m.

Figure 6:
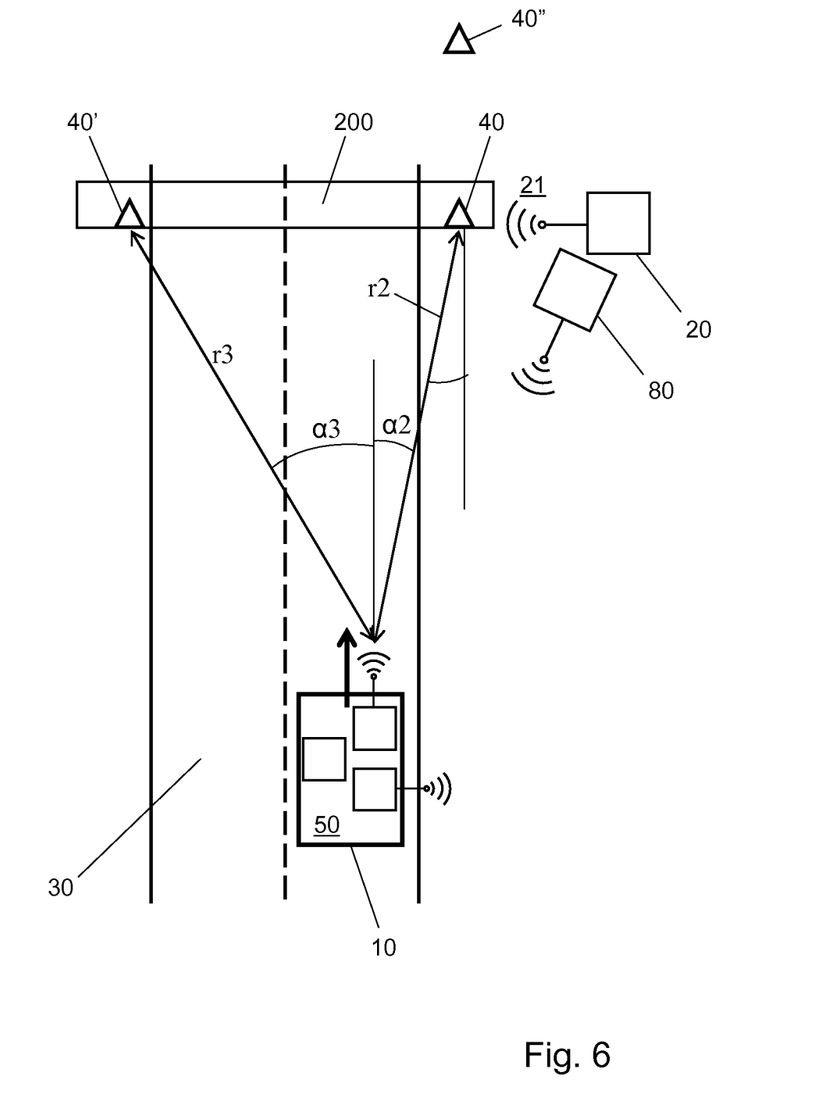
FIG. 6 shows a further embodiment including multiple reflectors.

FIG. 6 provides an alternative embodiment of a road side unit that may extend over the span of a road 30, e.g. in the form of a traffic light or road signalling structure 200. The marker unit may have multiple passive markers 40,40', etc. that can be used for triangulation and second distance position measurement of the vehicle 50 relative to the marker unit 20, in a way as previously described. When plural passive markers 40, 40' are used, the robustness of the system 200 can be increased by recalibrating the system, e.g. omitting passive markers 40 that may appear to be outside an expected position from the first distance measurement. That is, when a radar detection of a passive marker 40" is detected outside an expected first distance, this may be communicated to the marker system 200.

This may be convenient when not all passive markers are fixed to the marker system 20 but separately positioned at a certain distance.

Conversely in an alternative (re)calibration, vehicles may detect a fine (second) distance of a designated passive marker to be recalibrated and communicate their absolute position and the measured second distance back to the road side unit, resulting in a statistically corrected passive marker location.

Moreover a suitable alternative use of the localization method is to calibrate road observation units 200 including a road side unit 20 and a detection camera 80. The detection camera 80 requires calibration of observed vehicles to absolute positions. The observation unit 200 may be of a visual inspection type (e.g. camera), but can also be of a non-visual type (e.g. IR, radar, laser scanning). Conventionally a special RTK GPS equipped vehicle records a trajectory in parallel to a trajectory recorded by a camera, which also uses his RTK GPS position. These are compared to determine the offset of the camera. With the disclosed detection method, the RSU 200 knows its position and a vehicle having a localization unit 50 can determine its position when approaching the RSMU 200. A trajectory recorded by a localization unit 50 in a vehicle can be used to (re) calibrate the camera 80. Therefore, the localization unit 50 transmits the trajectory to the RSMU 200. This may require clock synchronization for the points in a trajectory, to correlate locations observed by the camera 80 and the localization unit 50 based on these timestamps. Accordingly, as a subsequent step to the localization method, a vehicles instantaneous absolute or relative position may be transmitted back to the road side unit; and coupled to a visual detection system 80, that can be provided with the location information. After calculating the vehicle's instantaneous geographical position from the second distance measure and the marker's known geographical position a vehicle's instantaneous geographical position may be transmitted back to the marker system 200; the marker comprised in a road side unit having a vehicle detection system 80; and feeding the instantaneous geographical position to the vehicle detection system 80; comparing the instantaneous geographical position with a vehicle position s detected by the vehicle detection system 80; and adjusting the vehicle position detected by the vehicle detection system with the instantaneous geographical position d to calibrate the vehicle detection system 80.

Other variations to the disclosed embodiments can be understood and by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A system for localizing a vehicle in a marked environment, i.e. provided with a set of markers, e.g. on a road side, the markers emitting a position signal indicative of a respective marker's known geographical position; the system comprising:
    a localization unit provided in the vehicle, the localization unit comprising a processing unit, a communication unit and a distance detection unit, the processing unit adapted to receive, via said communication unit, said position signal of a respective marker;
    the processing unit adapted to receive said known geographical position from the position signal of said respective marker; and to estimate a first distance measure of the vehicle relative to the respective marker based on a position signal measurement;
    the processing unit feeding said estimated first distance measure to the distance detection unit; the distance detection unit adapted to detect a second distance measure of said respective marker within the first distance measure;
    the distance detection unit adapted to provide the processing unit with the second distance measure of the vehicle relative to the detected respective marker; and
    the processing unit calculating an instantaneous geographical position of said vehicle from the second distance measure and the marker's known geographical position.

2. A system according to claim 1, wherein the position signal is a radio signal.

3. A system according to claim 1, wherein a reception distance of the position signal is larger than 200 m; and wherein the first distance measure has an accuracy of 10 m.

4. A system according to claim 1, wherein the position signal measurement is a time of flight measurement or received signal strength measurement.

5. A system according to claim 1, wherein the distance detection unit is adapted to detect the second distance measure with a distance smaller than 200 m.

6. A system according to claim 1, wherein the distance detection unit comprises a radar emitter and radar receiver; and a distance measurement unit coupled to the radar emitter and receiver.

7. A system according to claim 1, wherein the distance measurement unit comprises an angle detection block.

8. A system according to claim 7, wherein the angle detection block comprises an angular aperture in the forward direction of the vehicle.

9. A system according to claim 1, wherein the position signal additionally comprises localisation information of a set of passive markers nearby the respective marker that are detectable by the distance detection unit.

10. A system according to claim 9, wherein the set of passive markers is detected within a first distance window calculated from the first distance measure and the localisation information received from the position signal.

11. A method for localizing a vehicle in a marked environment, i.e. provided with a set of markers, e.g. on a road side, the markers emitting a position signal indicative of a respective marker's known geographical position; and the vehicle comprising a localization unit provided in the vehicle, the localization unit comprising a processing unit, a communication unit and a distance detection unit, the method comprising:
    receiving, by the processing unit, said known geographical position from the position signal of said respective marker; and estimating a first distance measure of the vehicle relative to the respective marker based on a position signal measurement;
    feeding said estimated first distance measure to the distance detection unit; the distance detection unit adapted to detect a second distance measure of said respective marker within the first distance measure;
    providing the processing unit with the second distance measure of the vehicle relative to the detected respective marker; and
    calculating an instantaneous geographical position of said vehicle from the second distance measure and the marker's known geographical position.

12. A method according to claim 11, further comprising: transmitting, via the communication unit, a vehicle's instantaneous geographical position to the marker; the marker comprised in a road side unit having a vehicle detection system; and feeding the instantaneous geographical position to the vehicle detection system; comparing the instantaneous geographical position with a vehicle position detected by the vehicle detection system; and adjusting the vehicle position detected by the vehicle detection system with the instantaneous geographical position to calibrate the vehicle detection system.

13. A method according to claim 11, wherein the position signal further comprises localisation information of a set of passive markers nearby the respective marker that are detectable by the distance detection unit, when receiving the localisation information further comprising: transmitting, via the communication unit, a vehicle's instantaneous geographical position relative to a passive marker and distance of a designated passive marker and updating the localisation information of the set of passive markers by comparing multiple transmitted distances of a designated passive marker.

14. A system according to claim 1, wherein the position signal is an ITS-G5 signal.

* * * * *